US007283456B2

(12) United States Patent
Tomita (10) Patent No.: US 7,283,456 B2
(45) Date of Patent: Oct. 16, 2007

(54) REPRODUCTION-ONLY RECORDING MEDIUM

(75) Inventor: Yoshimi Tomita, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 746 days.

(21) Appl. No.: 10/690,506

(22) Filed: Oct. 23, 2003

(65) Prior Publication Data
US 2004/0085888 A1    May 6, 2004

(30) Foreign Application Priority Data
Oct. 24, 2002    (JP)    ............................ P2002-310153

(51) Int. Cl.
*G11B 7/24* (2006.01)
(52) U.S. Cl. .................. 369/275.3; 369/59.25; 369/47.22; 369/275.4
(58) Field of Classification Search .. 369/275.1–275.5, 369/59.25, 53.24, 126, 47.27, 53.2, 47.14, 369/47.12, 53.37, 53.21, 30.12, 30.15, 47.22, 369/47.15
See application file for complete search history.

(56) References Cited

U.S. PATENT DOCUMENTS 5,126,741 A    6/1992  Yoshida ...................... 341/155

| 5,173,886 | A | * | 12/1992 | Satoh et al. | ............. | 369/30.15 |
| 6,147,957 | A | * | 11/2000 | Nagara et al. | ........... | 369/59.11 |
| 6,661,763 | B2 | * | 12/2003 | Kurashina et al. | ....... | 369/59.25 |
| 2003/0185128 | A1 | * | 10/2003 | Shoji et al. | ............. | 369/59.25 |

FOREIGN PATENT DOCUMENTS

| JP | 3-116441 A | 5/1991 |
| JP | 5-004696 | 2/1997 |
| JP | 09-259538 | 10/1997 |
| JP | 2002-008269 | 1/2002 |

OTHER PUBLICATIONS

JIS Handbook Information Processing for hardware, Japanese Standards Association, Apr. 21, 1999, pp. 1283-1295.

* cited by examiner

*Primary Examiner*—Ali Neyzari
*Assistant Examiner*—D. Johnson
(74) *Attorney, Agent, or Firm*—Drinker Biddle & Reath LLP (57) ABSTRACT

In a read-in area on the ROM disc, there are two control-data areas, and the Disc Information recorded in each control-data area comprises a error correction code (ECC (Error Correcting Code) block that has the same contents times, and the control-data area where reproduction-control data is recorded is separated from the other control-data area by a distance greater than the width than the width in the radial direction of the largest black dot.

8 Claims, 6 Drawing Sheets

REPRODUCTION-ONLY RECORDING MEDIUM

BACKGROUND OF THE INVENTION

1. Field of the Invention

This invention relates to a readable optical disc from which the data recorded on the optical disc can be read even when there are areas of missing data caused by black dots or the like.

2. Description of the Related Art

In recent years, the so-called DVD (Digital Versatile Disc) has become widely used and is becoming the norm as a disc-shaped data-recording medium that is capable of high-density data recording.

Conventionally, a control-data area is formed on an optical disc such as a DVD for recording beforehand ID data for the optical disc and control data for the contents data that are recorded on the optical disc. Also, when reproducing the data on the optical disc, the ID data and control data recorded in this control area are read in order to perform reproduction control of the contents data.

Moreover, the optical disc is such that it is irradiated by a laser beam emitted from the optical head of the reproduction apparatus. In this way, the pits recorded on the optical disc are traced, and the contents data, ID data and control data are read.

With this kind of optical disc, when there are flaws or black dots on the disc, the optical head of the reproduction apparatus jumps and the same location on the disc is repeatedly reproduced, or it becomes impossible to read data recorded in a black dot.

Therefore, recently, control of the tracking is performed when reproducing the data on the optical disc. This control of the tracking is called tracking control.

The control data is particularly important data when reproducing the data recorded on the optical disc. Therefore, as a recent method of reproducing data on the optical disc, reproduction failure and the inability to read data are prevented by performing not only the tracking control described above, but also by encoding the control data using an error-correction signal or Wobble signal.

Therefore, by using an error-correction signal or Wobble signal in addition to performing tracking control for the optical disc, errors are corrected by guessing the correct data from other read data as Error-Correcting, and the control data can be read accurately even when it is not possible to read part of the control data due to black dots.

However, in the case of a reproduction-only optical disc such as a DVD on which data are recorded with high density, the data on the optical disc are reproduced while detecting the pits that represent data. Therefore, when a missing area occurs due to flaws or black dots on the optical disc, that missing area becomes the source of a tracking error, and there is a possibility that it will be impossible to read the data recorded in that missing area.

In other words, at the normal NA of the objective lens for an optical disc (NA (Numerical Aperture: Opening number)=0.5) there is hardly any effect on reproduction due to tracking control or the Error Correction even when there are black dots. However, in the case of reading data from an optical disc having a high recording density, an objective lens having a high NA is used, so when there are areas of missing data due to black dots and when those areas of missing data are large, it becomes impossible to read data recorded in the areas of missing data using error correction or the Wobble method.

SUMMARY OF THE INVENTION

The present invention has been made in view of the above circumstances, it is the object of this invention to provide an optical disc, such as a DVD for example, and whose control data recorded on the optical disc can be read accurately even when there are flaws or black dots on the optical disc.

The above object of present invention can be achieved by a reproduction-only recording medium of the present invention. The reproduction-only recording medium is provided with: a contents data area where contents data is recorded; and a plurality of control-data areas where control data which controls reproduction of the recorded contents data is recorded using phase pits, wherein the control-data area on which the control data having the same contents is repeatedly recorded is formed.

With this construction, the invention is capable of reading the recorded control data from another control-data area on which the same contents as the control data is recorded, even when it is not possible to read the control data due to black dots or flaws on the surface of the disc from one of control-data areas.

Therefore, since the optical disc has high tolerance to dirt on the optical disc, it is possible to provide an optical disc withstanding worsening conditions of operation.

In one aspect of the present invention, the reproduction-only recording medium of the present invention is further provided with; each the control-data area is separated from other the control-data areas by a width which is greater than the width in the radial direction of the recording medium of missing data area which causes the control data to be missing when reproducing the recording medium.

With this construction, the invention is capable of reading the recorded control data from another control-data area on which the same contents as the control data is recorded, even when it is not possible to read the control data due to black dots or flaws on the surface of the disc from one of control-data areas. Therefore, it is possible to read precisely the control data recoded on the reproduction-only recording medium in case where there are the black dots or the flaws on the surface of the disc.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; the control-data area has the width of 0.1 mm in the radial direction of the recording medium of the missing-data area.

With this construction, the invention is capable of reading the recorded control data from another control-data area on which the same contents as the control data is recorded, even when it is not possible to read the control data due to black dots or flaws on the surface of the disc from one of control-data areas. Therefore, it is possible to read precisely the control data recoded on the reproduction-only recording medium in case where there are the black dots or the flaws on the surface of the disc.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; the control-data area has at least missing-data area which is a black dot occurred in the manufacturing process of the recording medium.

With this construction, the invention is capable of reading the recorded control data from another control-data area on which the same contents as the control data is recorded, even when it is not possible to read the control data due to black dots or flaws on the surface of the disc from one of control-data areas. Therefore, it is possible to read precisely the control data recoded on the reproduction-only recording medium in case where there are the black dots or the flaws on the surface of the disc.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; the control-data area on which at least the control data, which is read by an optical means having a numerical aperture of 0.75 or more, is recorded is formed.

With this construction, the invention is capable of reading the recorded control data from another control-data area on which the same contents as the control data is recorded, even when it is not possible to read the control data due to black dots or flaws on the surface of the disc from one of control-data areas. Therefore, it is possible to read precisely the control data recoded on the reproduction-only recording medium in case where there are the black dots or the flaws on the surface of the disc.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; the control-data area on which at least the control data, which is reproduced by an optical means having a light beam wavelength of 440 nm or less, is recorded is formed.

With this construction, the invention is capable of reading the recorded control data from another control-data area on which the same contents as the control data is recorded, even when it is not possible to read the control data due to black dots or flaws on the surface of the disc from one of control-data areas. Therefore, it is possible to read precisely the control data recoded on the reproduction-only recording medium in case where there are the black dots or the flaws on the surface of the disc.

Accordingly, since the optical disc has high tolerance to dirt on the optical disc, it is possible to provide an optical disc withstanding worsening conditions of operation.

The above object of present invention can be achieved by a reproduction-only recording medium of the present invention. The reproduction-only recording medium is provided with: a contents data area where contents data is recorded; and a control-data area where control data which controls reproduction of the recorded contents data is recorded using phase pits, the control-data area having a preset width in the radial direction of the recording medium, wherein the control-data area on which the control data having the same contents is repeatedly recorded is formed.

With this construction, in the invention, even when there are black dots in the control-data area or there are flaws on the disc surface, reading errors due to black dots and the like do not occur when reading all of the data of the control area, and reproduction is performed accurately by reading one set of repeatedly recorded control data. Therefore, it is possible to accurately read the control data recorded on the recording medium even when there are flaws or black dots on the reproduction-only recording medium.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; the control-data area has a width greater than the width in the radial direction of the recording medium of the missing-data area which causes control data to be missing when reproducing the recording medium.

With this construction, in the invention, even when there are black dots in the control-data area or there are flaws on the disc surface, reading errors due to black dots and the like do not occur when reading all of the data of the control area, and reproduction is performed accurately by reading one set of repeatedly recorded control data. Therefore, it is possible to accurately read the control data recorded on the recording medium even when there are flaws or black dots on the reproduction-only recording medium.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; the control-data area has the width of 0.1 mm in the radial direction of the recording medium of the missing-data area.

With this construction, in the invention, even when there are black dots in the control-data area or there are flaws on the disc surface, reading errors due to black dots and the like do not occur when reading all of the data of the control area, and reproduction is performed accurately by reading one set of repeatedly recorded control data. Therefore, it is possible to accurately read the control data recorded on the recording medium even when there are flaws or black dots on the reproduction-only recording medium.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; he control-data area has at least missing-data area which is a black dot occurred in the manufacturing process of the recording medium.

With this construction, in the invention, even when there are black dots in the control-data area or there are flaws on the disc surface, reading errors due to black dots and the like do not occur when reading all of the data of the control area, and reproduction is performed accurately by reading one set of repeatedly recorded control data. Therefore, it is possible to accurately read the control data recorded on the recording medium even when there are flaws or black dots on the reproduction-only recording medium.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; the control-data area on which at least the control data, which is read by an optical means having a numerical aperture of 0.75 or more, is recorded is formed.

With this construction, in the invention, even when there are black dots in the control-data area or there are flaws on the disc surface, reading errors due to black dots and the like do not occur when reading all of the data of the control area, and reproduction is performed accurately by reading one set of repeatedly recorded control data. Therefore, it is possible to accurately read the control data recorded on the recording medium even when there are flaws or black dots on the reproduction-only recording medium.

Accordingly, since the optical disc has high tolerance to dirt on the optical disc, it is possible to provide an optical disc withstanding worsening conditions of operation.

In one aspect of the present invention, the s reproduction-only recording medium of the present invention is further provided with; the control-data area on which at least the control data, which is reproduced by an optical means having a light beam wavelength of 440 nm or less, is recorded is formed.

With this construction, in the invention, even when there are black dots in the control-data area or there are flaws on the disc surface, reading errors due to black dots and the like do not occur when reading all of the data of the control area, and reproduction is performed accurately by reading one set of repeatedly recorded control data. Therefore, it is possible to accurately read the control data recorded on the recording medium even when there are flaws or black dots on the reproduction-only recording medium.

Accordingly, since the optical disc has high tolerance to dirt on the optical disc, it is possible to provide an optical disc withstanding worsening conditions of operation.

DESCRIPTION OF THE PREFERRED EMBODIMENTS

Next, the preferred embodiments of the optical disc of this invention will be explained based on the drawings.

First Embodiment

A first embodiment of a reproduction-only optical disc (hereafter called a ROM disc) will be explained using FIG. 1 to FIG. 4.

Figure 1:
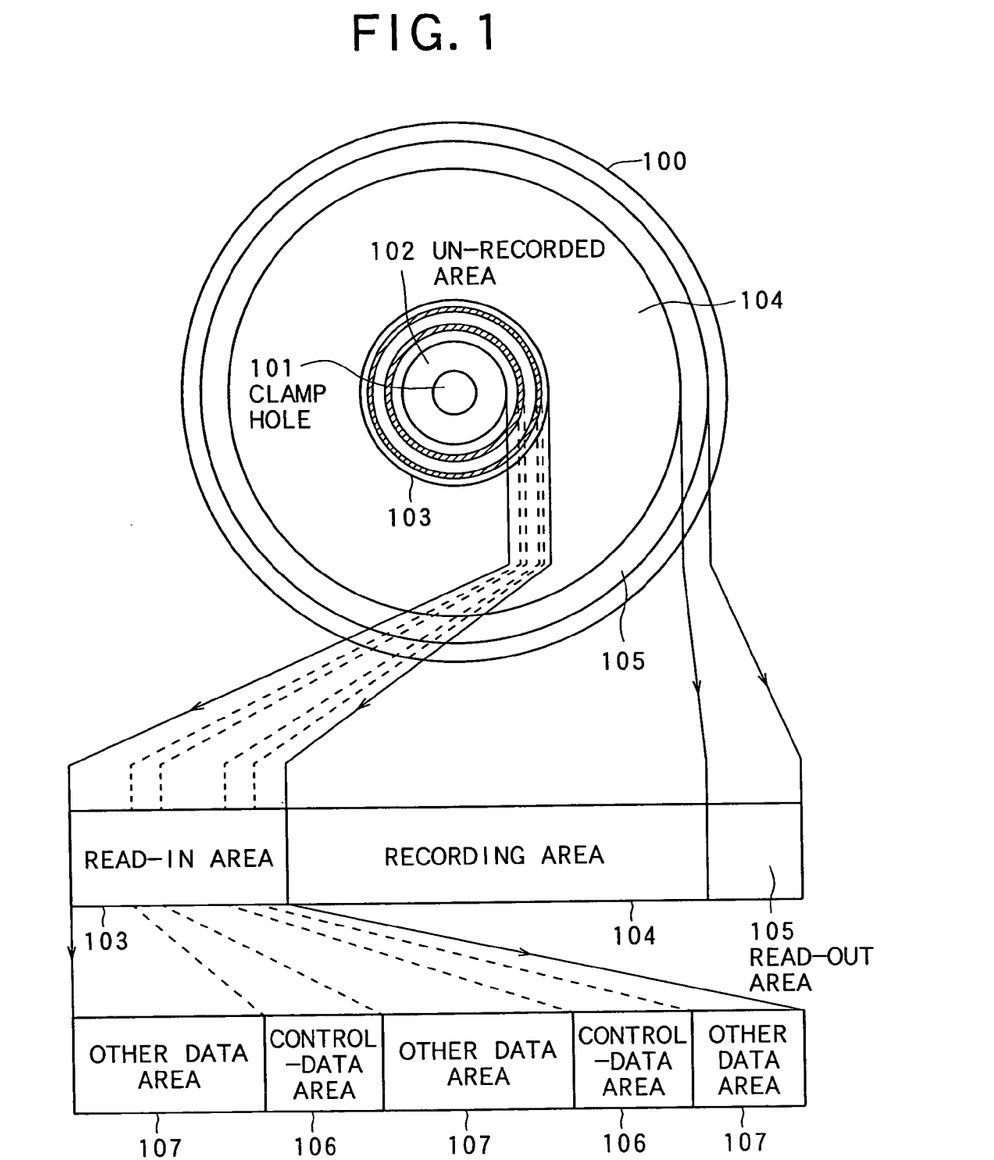
FIG. 1 is a schematic drawing showing the physical construction of a first embodiment of a ROM (Read Only Memory) disc of this invention.
Figure 2:
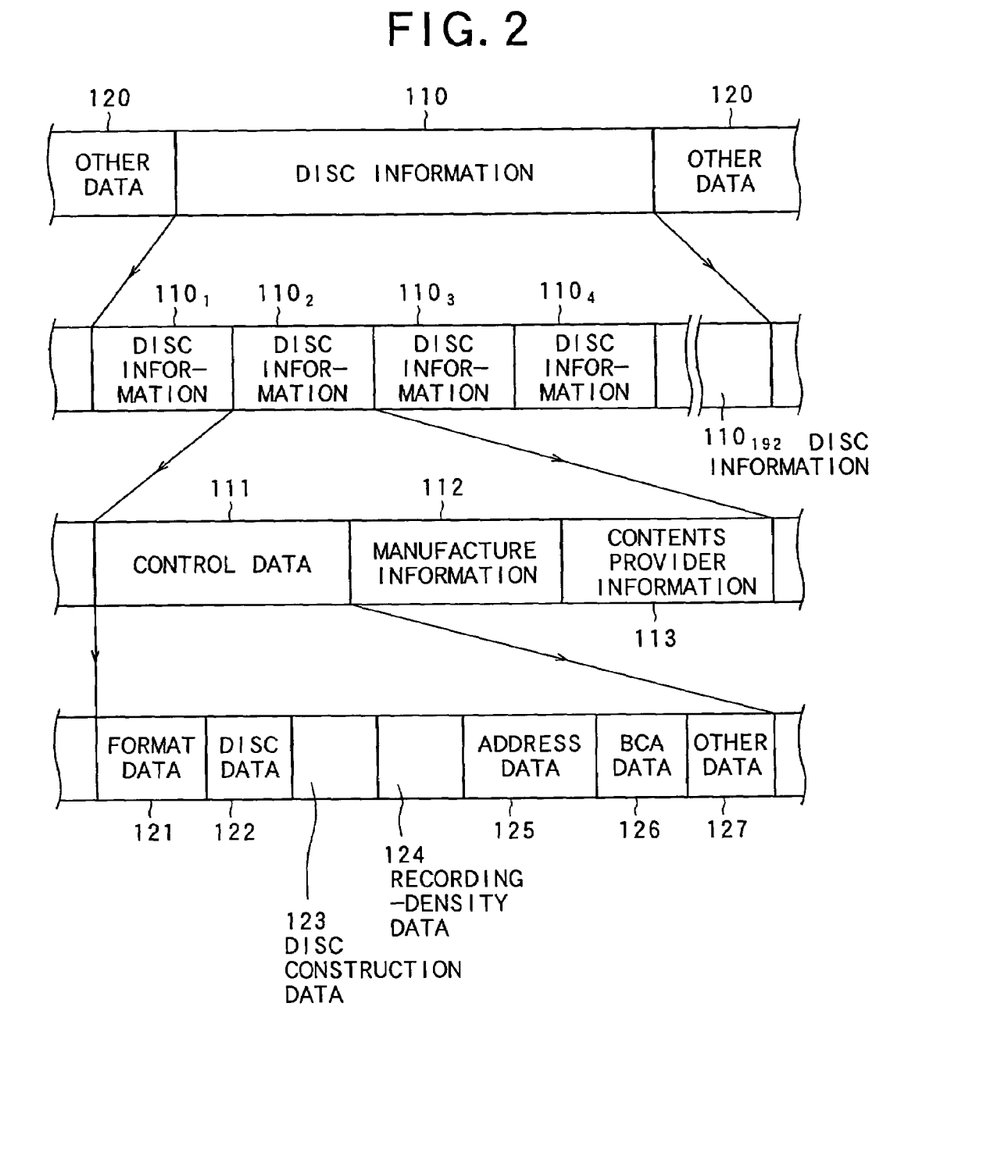
FIG. 2 is a drawing showing the structure of the control data of this first embodiment.

First, FIG. 1 and FIG. 2 will be used to explain the physical construction of the ROM disc of this embodiment.

FIG. 1 is a schematic drawing showing the physical construction of the ROM disc, and FIG. 2 is a drawing showing the structure of the control data.

As shown in FIG. 1, the ROM disc 100 comprises: a clamp hole 101 for securing the inside of the ROM disc to the rotating shaft of the spindle motor (not shown in the figure) of the reproduction apparatus that reproduces data on the ROM disc 100; an unrecorded area 102 used for securing the clamp hole 101; a read-in area 103 where control data for controlling the ROM disc and contents data such as reproduction-control data for controlling reproduction of the contents data; a recording area 104 where the contents data are actually recorded; and a read-out area 105 where various data for ending data recording or ending data reproduction are recorded.

For example, the read-in area 103 of this embodiment saves as the control-data area of this invention, and the recording area 104 of this embodiment saves as the contents data area of this invention.

In the read-in area 103, there is a control-data area 106, where Disc Information (control data) 110 that control reproduction of the data on the ROM disc is recorded, and other data area 107, where data (hereafter called other data) 120 such as data for performing copy protection or the like is recorded. The Disc Information 110 recorded in this control-data area 106 comprises: reproduction-control data 111 that controls reproduction of the contents data when reproducing the data on the ROM disc 100; Manufacture Information 112 which is data about the ROM disk 100 itself such as ID information for the ROM disc 100; and Contents Provider Information 113 such as attribute data or copyright data of the contents, which is used by the provider of the contents data when controlling the contents data.

In this read-in area 103, there are two control-data areas 106A, 106B, and the disc information 110 recorded in each control-data area 106A, 106B comprises an error correction code (ECC (Error Correcting Code) block (Disc Information 110n) that has the same contents of 192.

One block of Disc Information 110n has Control Data 111 in the first sector at the beginning, which controls reproduction of the contents data when reproducing the ROM disc 100, and in the following sectors, there is the Manufacture Information 112 and Contents Provider Information 113.

Also, as shown in FIG. 2, the control data 111 , comprises: format data 121 that indicates the format of the recorded contents data; disc data 122 that contains disc size data for the ROM disc 100 and transfer rate data for when reproducing the contents data; disc construction data 123 that indicates the construction of the disc, whether it is a single-layer disc or multi-layer disc; recording-density data 124 that indicates the recording density of the contents data; address data 125 that indicates the address and recording starting position of the contents data; BCA (Bust Cutting Aria) data 126 that indicates whether or not there is BCA; and other data 127. All of the data comprised the control data 111 has a specified number of bytes in a pre-determined byte position for each kind of data.

For example, the control data 111 of this embodiment is the control data of this invention.

Figure 3:
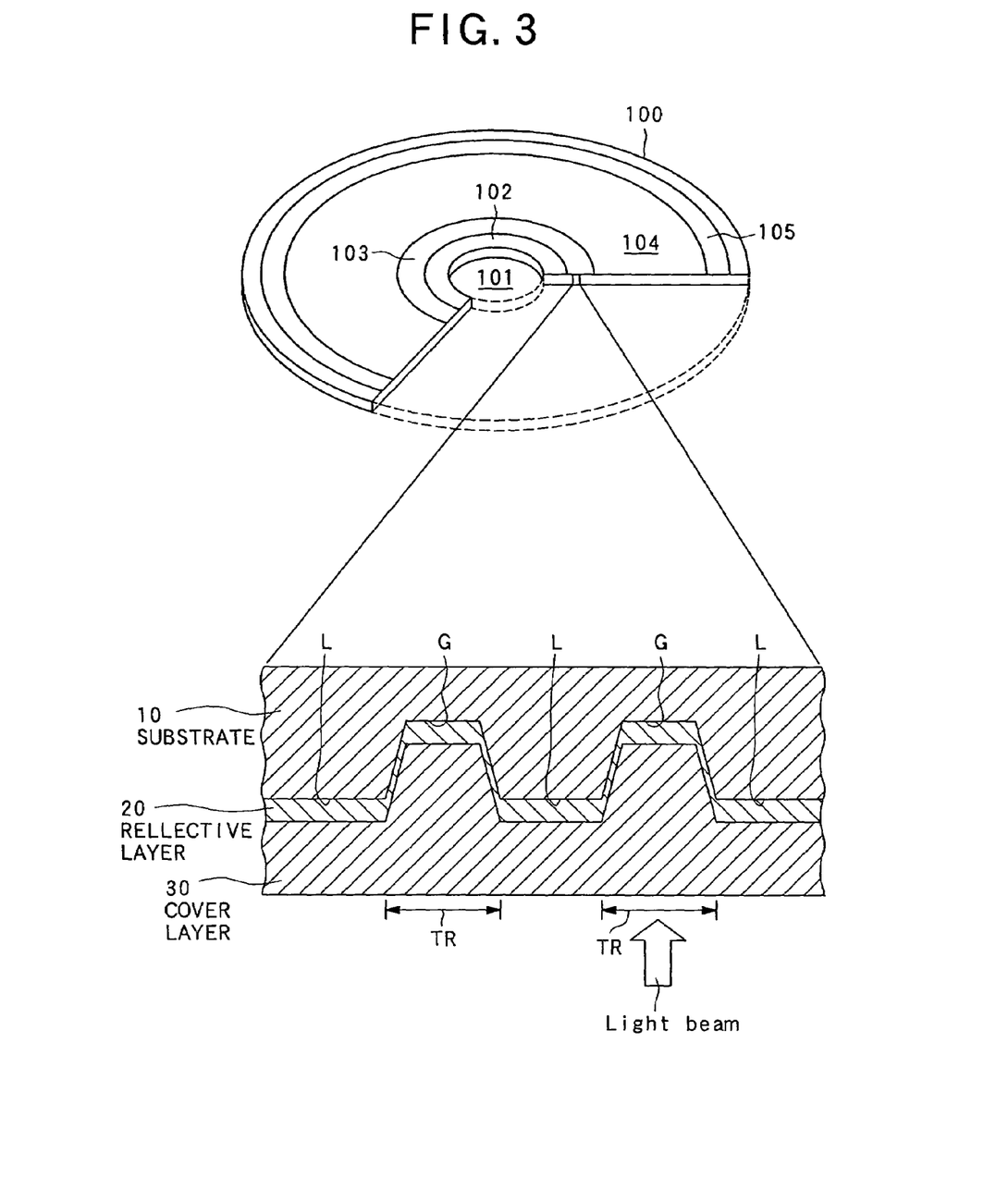
FIG. 3 is a construction drawing showing the disc construction of the ROM disc of this first embodiment.

Here, FIG. 3 is used to explain the disc construction of the ROM disc 100.

FIG. 3 is a drawing showing the disc construction of the ROM disc 100.

As shown in FIG. 3, the ROM disc 100 of this embodiment comprises: a substrate 10 that is formed with phase pits that contain control data and contents data; a reflective layer 20 that reflects a light beam that is irradiated from the reproduction apparatus (not shown in the figure); and a cover layer 30 that protects all of the other layers.

For example, in this embodiment, the depth of the phase pits is 60 nm, and the distance between adjacent recording tracks TR (track pitch) is 0.32 μm.

In this embodiment, the length in the circumferential direction of the phase pits formed on the substrate 10 (hereafter called the pit length) is 2T to 9T.

Here T is the inverse of the frequency, which is the basis for frequency conversion when reading the data on the phase pits during reproduction of the ROM disc 100.

In this embodiment, by having this kind of construction, data are recorded on the ROM disc 100 with high density, and the ROM disc 100 has an overall recording capacity of 25 Gbytes.

Also, in this embodiment, when reproducing the data on the ROM disc 100, and the reproduction apparatus (not shown in the figure) irradiates a light beam onto the recording track TR, data recorded on the track TR is read based on the decrease in reflectivity of the light beam depending on whether or not there is a phase pit and on the phase difference between the light beam irradiated onto the recording track TR and the light beam irradiated on areas which is different areas from the recording track TR.

When reproducing the data on the ROM disc having this kind of construction, the reproduction apparatus (not shown in the figure) must irradiate a high wavelength ($\lambda$=440 nm or less) light beam onto the ROM disc 100 and reproduce the data using a high NA (NA=0.75 or greater) objective lens.

In regards to the construction described above, the construction of the read-in area is shown in FIG. 3, however, other areas such as the recording area 104 and the read-out area 105 have the same construction.

Figure 4:
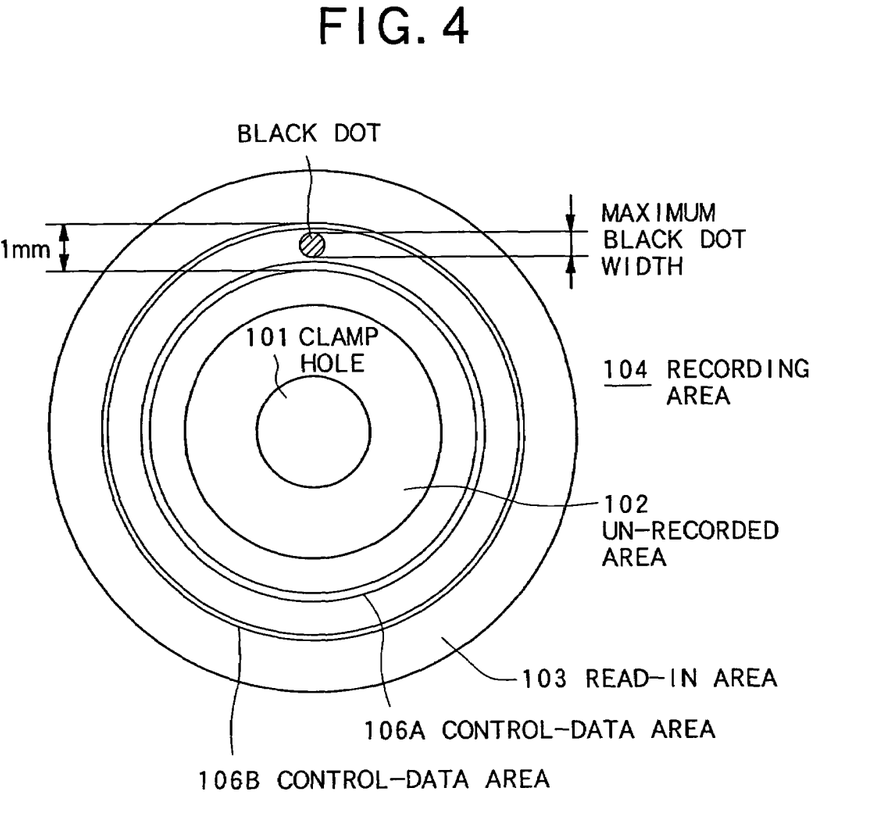
FIG. 4 is a drawing for explaining the relationship between the control-data area and the black dots in this first embodiment.

Next, FIG. 4 will be used to explain the relationship between the control data and black dots.

FIG. 4 is a drawing for explaining the relationship between the control-data area and black dots.

As shown in FIG. 4, this control data is recorded in two preset control-data areas 106 in the read-in area 103.

The first control-data area 106A, where the control data is recorded, is separated from the other control-data area 106B by a distance greater than the width in the radial direction of the largest black dot; for example, in this embodiment, control-data area 106A and control-data area 106B are separated by a distance of 0.1 mm in the radial direction of the ROM disc 100.

This black dot is a place where there is missing data because the laser beam output from the optical head could not reach the pit due to foreign matter that adhered to the surface of the disc when forming the ROM disc 100. For example, it is a black dot that was formed when burned formation material, which adhered to the screw in the cylinder of the disc formation apparatus, adhered to the surface of the disc when forming the disc.

Also, the black dot has a maximum width of 0.1 mm in the radial direction of the optical disc.

This black dot, for example, is the area of missing data of this invention.

In a conventional optical disc, the Disc Information is recorded on the recording medium at only one place, and even if data having the same contents was recorded repeatedly 192 times, the width in the radial direction of the optical disc is only 60 μm.

Therefore, when a black dot, having a maximum width in the radial direction of the optical disc, is located in the area where the Disc information is recorded, it becomes impossible to read the Disc information in that location during reproduction.

However, in this embodiment, even though the disc information 110 that is recorded in control-data area 106A cannot be read due to a black dot that is formed in the control-data area 106A, the other control-data area 106B is not affected by the black dot, so it is possible to obtain the disc information 110 during reproduction by reading the disc information 110 recorded in the other control-data area 106B.

With the embodiment described above, there is a recording area 104 where the contents data is recorded, and a control-data area 106 where control data for controlling reproduction of the recorded contents data is recorded; and the disc information 110 is recorded using phase pits in at least the control-data area 106, and this disc information 110 having the same contents is repeatedly recorded in this area.

In this embodiment having this kind of construction, even though it is not possible to read the Disc Information 110 from one of the control-data areas 106 due to a black dot or flaw on the disc surface, it is possible to read the Disc Information 110 from another control-data area 106, so even when there are flaws or black dots on the ROM disc 100, it is possible to accurately read the Disc Information recorded on the ROM disc 100.

Therefore, since the optical disc has high tolerance to dirt on the optical disc, it is possible to provide an optical disc withstanding worsening conditions of operation.

Also, in case where black dots are formed that cause some Disc Information 110 to be missing when reproducing the ROM disc 100, each of the control-data areas 106 are separated from other control-data areas 106 in the radial direction of the ROM disc 100 by the width of the black dot in the radial direction of the ROM disc 100.

In this embodiment having this kind of construction, even though it is not possible to read the Disc Information 110 from one of the control-data areas 106 due to a black dot or flaw on the disc surface, it is possible to read the Disc information 110 from another control-data area 106, so even when there are flaws or black dots on the ROM disc 100, it is possible to accurately read the Disc Information recorded on the ROM disc 100.

Therefore, since the optical disc has high tolerance to dirt on the optical disc, it is possible to provide an optical disc withstanding worsening conditions of operation.

In this embodiment, the portion of missing data is explained using black dots that is occurred innately when manufacturing the disc, however, of course the same effect is obtained in case where the portion of missing data is occurred according to the cause of surface flaws and foreign matter adhered to the surface of the disc after the disc was manufactured.

Also, in this embodiment, control-data areas are located at two locations in the read-in area, and Disc information is recorded in those areas, however, it is possible to have control-data areas located at more that two locations in the read-in area, and it is also possible to have control-data areas located in areas expect the read-in area such as in the read-out area or recording area.

Second Embodiment

Figure 5:
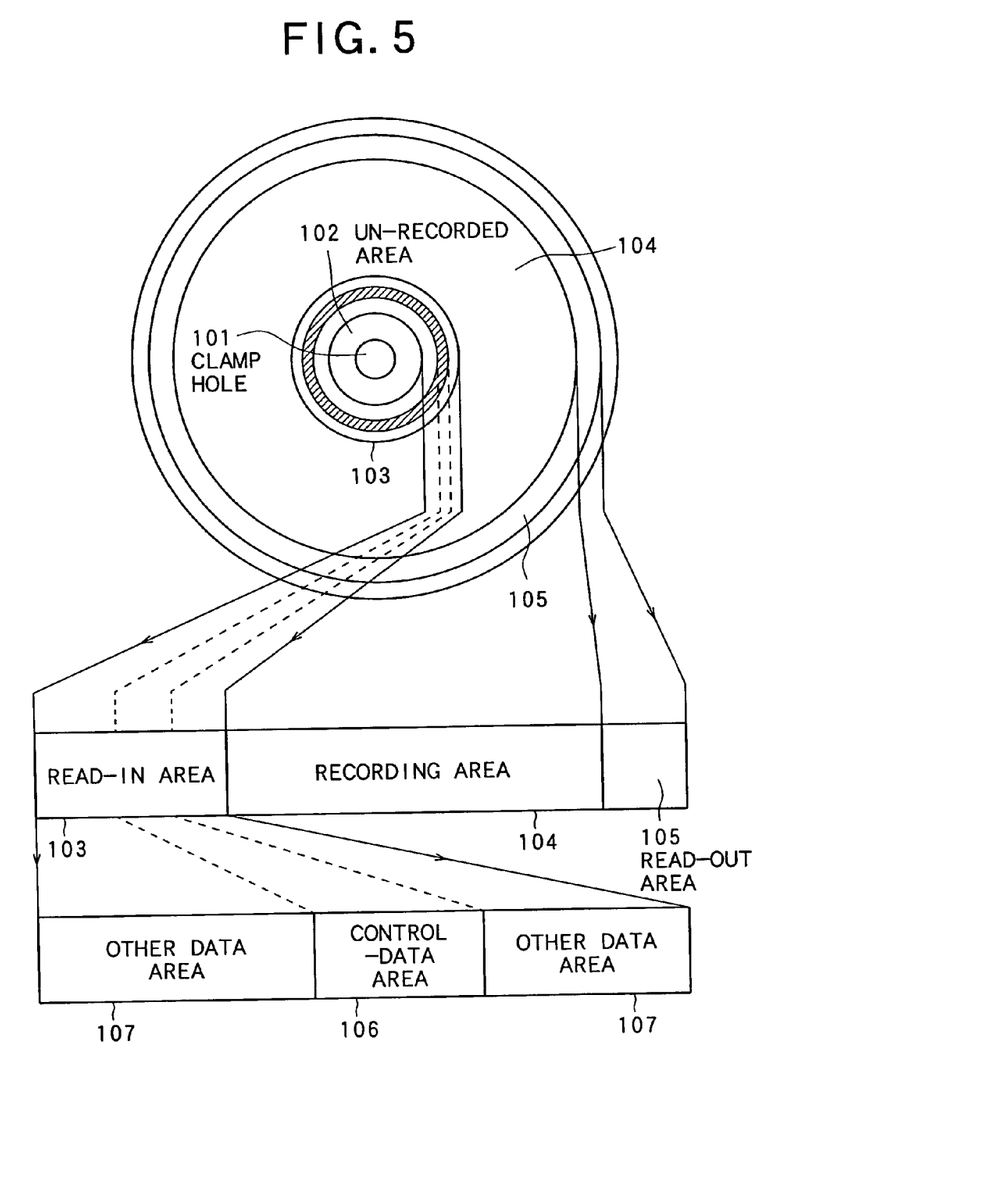
FIG. 5 is a schematic drawing showing the physical construction of a second embodiment of the ROM disc of this invention.
Figure 6:
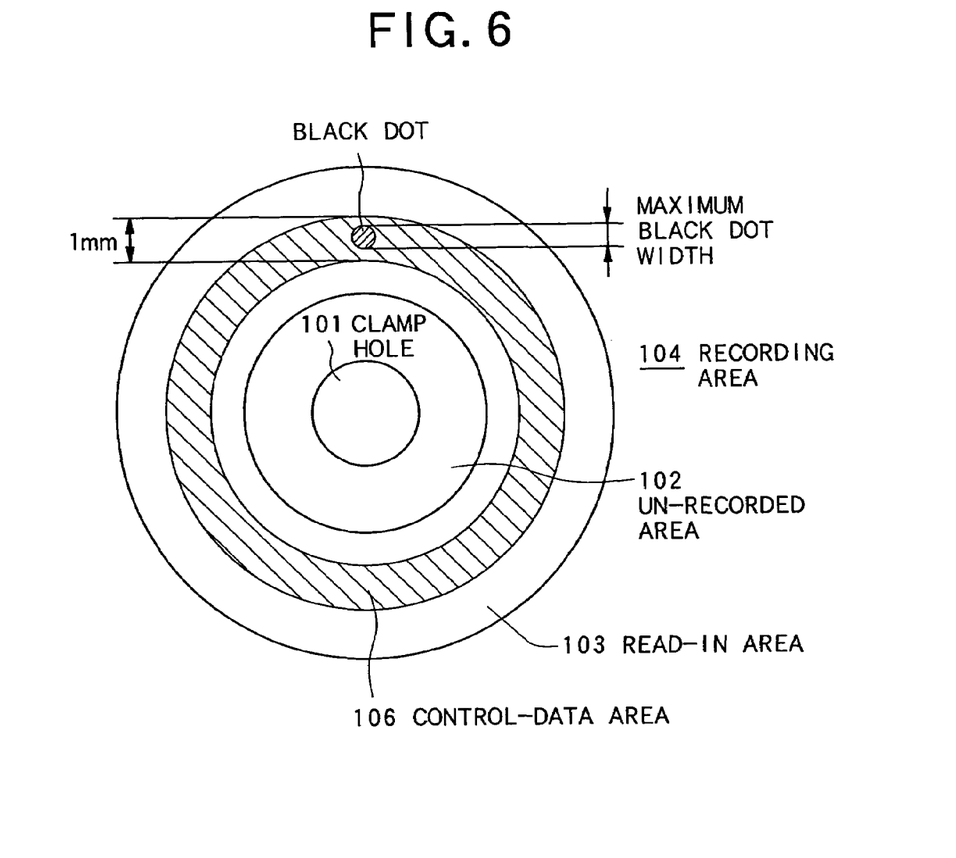
FIG. 6 is a drawing for explaining the relationship between the control-data area and the black dots in this second embodiment.

Next, FIG. 5 and FIG. 6 will be used to explain a second embodiment of the ROM disc.

In this embodiment, instead of a plurality of control-data areas in the read-in area as in the first embodiment, there is a control-data area having a preset width in the radial direction of the ROM disc. The other parts are the same as those in the first embodiment so the same reference numbers will be used for identical parts, and an explanation of those parts will be omitted.

The physical construction of the ROM disc of this embodiment will be explained using FIG. 5 and FIG. 6.

FIG. 5 is a schematic drawing showing the physical construction of the ROM disc, and FIG. 6 is a drawing for explaining the relationship between the control-data area and the black dot.

The ROM disc shown in FIG. 5, similar to that of the first embodiment, comprises: a clamp hole for fastening the ROM disc 200 to the rotating shaft of the spindle motor (not shown in the figure) of the reproduction apparatus that reproduces the data on the ROM disc 200; an unrecorded area 102 used for securing the clamp hole 101; a read-in area 103 where control data for controlling the ROM disc and contents data such as reproduction-control data for controlling reproduction of the contents data; a recording area 104 where the contents data are actually recorded; and a read-out area 105 where various data for ending data recording or ending data reproduction are recorded.

Similar to the first embodiment, in the read-in area 103, there is a control-data area 106 where Disc Information 110 is recorded, and another data area 107 where other data 120 is recorded. The Disc Information 110 comprises: Control Data 111, Manufacture Information 112, and Contents Provider Information 113.

In this read-in area 103, there are control-data areas 106, and the Disc Information 110 recorded in each control-data area 106 comprises an error correcting code (ECC (Error Correcting Code) block (Disc Information 110).

In other words, the Disc Information 110 comprises error correcting code (ECC (Error Correcting Code)) blocks (Disc Information 110) that has the same contents of 192.

In this embodiment, the control-data area 106 where the Control Data is recorded has a width in the radial direction of the ROM disc that is greater than the width of the largest black dot in the radial direction, for example, the control-data area 106 has a width that is 0.8 mm in the radial direction of the ROM disc 200.

In a conventional optical disc, the control data is recorded on the recording medium at only one place, and even if data having the same contents is recorded repeatedly 192 times, the width in the radial direction of the optical disc is only 60 μm.

Therefore, when there is a black dot having a maximum width of 0.1 mm in the radial direction of the optical disc located in the area where the Disc Information is recorded, it becomes impossible to read the Disc Information in that location during reproduction.

However, as shown in FIG. 6, in this embodiment, even when there is a black dot formed in part of the control-data area 106 and it is not possible to read the recorded Disc Information 110 or data that is recorded in that area of the ROM disc 200, the Disc Information is recorded repeatedly up to the control-data area 106 where it is not affected by the black dot, so it is possible to obtain the disc information 110 during reproduction by reading the Disc Information from an area expect the control area 106 where the black dot is formed.

In this embodiment, the control-data area 106 where the Control data is recorded has a width in the radial direction of the ROM disc that is greater than the width of the largest black dot in the radial direction, for example, the control-data area 106 has a width that is 0.8 mm in the radial direction of the ROM disc 200.

With the embodiment described above, there is a recording area 104 where the contents data is recorded, and a control-data area 106 having a preset width in the radial direction of the ROM disc 200 where Disc Information 110 for controlling reproduction of the recorded contents data is recorded; and this Disc Information 110 is recorded using phase pits in at least the control-data area 106, and Disc Information 110 having the same contents is repeatedly recorded in this area.

In this embodiment having this kind or construction, even though there are black dots or surface flaws in the control-data area 106, no reading errors due to black dots occur when reading all of the data of the control-data area 106, and it is possible to accurately perform reproduction by reading one of the repeatedly recorded areas of Disc Information 110. Therefore, even though there are flaws or black dots on the ROM disc 200, it is possible to accurately read the control data recorded on the ROM disc 200.

Therefore, since the optical disc has high tolerance to dirt on the optical disc, it is possible to provide an optical disc withstanding worsening conditions of operation.

Also, in case where black dots are formed that causes some Disc Information 110 to be missing when reproducing the ROM disc 200, the preset width of the control-data area 106 is greater than the width of the black dot in the radial direction of the ROM disc 200.

In this embodiment having this kind or construction, even though there are black dots or surface flaws in the control-data area 106, no reading errors due to black dots occur when reading all of the data of the control-data area 106, and it is possible to accurately perform reproduction by reading one of the repeatedly recorded areas of Disc Information 110. Therefore, even though there are flaws or black dots on the ROM disc 200, it is possible to accurately read the control data recorded on the ROM disc 200.

Therefore, since the optical disc has high tolerance to dirt on the optical disc, it is possible to provide an optical disc withstanding worsening conditions of operation.

In this embodiment, the portion of missing data is explained using black dots that is occurred innately when manufacturing the disc, however, of course the same effect is obtained in case where the portion of missing data is occurred according to the cause of surface flaws and foreign matter adhered to the surface of the disc after the disc was manufactured.

The entire disclosure of Japanese Patent Application No. 2002-310153 filed on Oct. 24, 2002 including the specification, claims, drawings and summary is incorporated herein by reference in its entirety.

What is claimed is:

1. A reproduction-only recording medium comprising:
  a contents data area where contents data is recorded; and
  a plurality of control-data areas where control data which controls reproduction of the recorded contents data is recorded using phase pits, wherein
  said control-data area on which the control data having the same contents is repeatedly recorded is formed,
  wherein each said control-data area is separated from other said control-data areas by a width which is greater than the width in the radial direction of said recording medium of a missing data area which causes the control data to be missing when reproducing said recording medium, and
  wherein said missing-data area is a black dot occurred in the manufacturing process of the recording medium.

2. The reproduction-only recording medium of claim 1 wherein
  said control-data area has the width of 0.1 mm in the radial direction of the recording medium of said missing-data area.

3. The reproduction-only recording medium of claim 1 wherein
  said control-data area on which at least the control data, which is read by an optical means having a numerical aperture of 0.75 or more, is recorded is formed.

4. The reproduction-only recording medium of claim 1 wherein
said control-data area on which at least the control data, which is reproduced by an optical means having a light beam wavelength of 440 nm or less, is recorded is formed.

5. A reproduction-only recording medium comprising:
a contents data area where contents data is recorded; and
a control-data area where control data which controls reproduction of the recorded contents data is recorded using phase pits, said control-data area having a preset width in the radial direction of said recording medium, wherein
said control-data area on which the control data having the same contents is repeatedly recorded is formed,
wherein said control-data area has a width greater than the width in the radial direction of the recording medium of a missing-data area which causes control data to be missing when reproducing said recording medium, and
wherein said missing-data area is a black dot occurred in the manufacturing process of the recording medium.

6. The reproduction-only recording medium of claim 5 wherein
said control-data area has the width of 0.1 mm in the radial direction of the recording medium of said missing-data area.

7. The reproduction-only recording medium of claim 5 wherein
said control-data area on which at least the control data, which is read by an optical means having a numerical aperture of 0.75 or more, is recorded is formed.

8. The reproduction-only recording medium of claim 5 wherein
said control-data area on which at least the control data, which is reproduced by an optical means having a light beam wavelength of 440 nm or less, is recorded is formed.

* * * * *